United States Patent
Suzuki

(12) 
(10) Patent No.: US 7,593,296 B2
(45) Date of Patent: Sep. 22, 2009

(54) OPTICAL DISK, PROGRAM, RECORDING MEDIUM, INFORMATION RECORDING APPARATUS AND RECORDING METHOD

(75) Inventor: Ryoichi Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 265 days.

(21) Appl. No.: 10/592,502

(22) PCT Filed: Feb. 22, 2006

(86) PCT No.: PCT/JP2006/303819

§ 371 (c)(1), (2), (4) Date: Sep. 12, 2006

(87) PCT Pub. No.: WO2006/090888

PCT Pub. Date: Aug. 31, 2006

(65) Prior Publication Data

US 2008/0212446 A1    Sep. 4, 2008

(30) Foreign Application Priority Data

Feb. 25, 2005    (JP) .............................. 2005-049927

(51) Int. Cl.
*G11B 7/00* (2006.01)

(52) U.S. Cl. .................................................. 369/47.15

(58) Field of Classification Search .. 369/100; G11B 7/007

See application file for complete search history.

(56) References Cited

U.S. PATENT DOCUMENTS

| | | | |
|---|---|---|---|
| 5,381,392 A * | 1/1995 | Hira | 369/53.23 |
| 6,594,207 B2 | 7/2003 | Suzuki et al. | |
| 6,731,577 B2 | 5/2004 | Suzuki et al. | |
| 6,782,434 B1 | 8/2004 | Suzuki et al. | |
| 7,149,164 B2 * | 12/2006 | Tsukihashi et al. | 369/47.24 |
| 2003/0059205 A1 | 3/2003 | Suzuki | |
| 2003/0063545 A1 | 4/2003 | Suzuki | |
| 2003/0231559 A1 | 12/2003 | Suzuki | |
| 2004/0131006 A1 * | 7/2004 | Hasegawa et al. | 369/275.3 |
| 2005/0063290 A1 | 3/2005 | Suzuki | |

FOREIGN PATENT DOCUMENTS

EP    0 825 591 A    2/1998

(Continued)

OTHER PUBLICATIONS

MAT (machine assisted translation) of JP 2002-269752, all pages.*
MAT (machine assisted translation) of JP 2001-023170, all pages.*

(Continued)

*Primary Examiner*—Peter Vincent Agustin
(74) *Attorney, Agent, or Firm*—Dickstein Shapiro LLP

(57) ABSTRACT

A method for recording information in a rewritable optical disk having plural recording layers is disclosed. The method includes the steps of selecting either a first recording mode dedicated to recording the information in an order applicable for recordable type optical disks or a second recording mode dedicated to recording the information in an order applicable for read-only type optical disk, and recording the information in the rewritable optical disk in accordance with the selected recording mode.

16 Claims, 10 Drawing Sheets

FOREIGN PATENT DOCUMENTS

| | | |
|---|---|---|
| JP | 2001-23170 | 1/2001 |
| JP | 2001-126255 | 5/2001 |
| JP | 2002-269752 | 9/2002 |
| JP | 2004-127390 | 4/2004 |
| JP | 2004-303421 | 10/2004 |

OTHER PUBLICATIONS

Extended European Search Report dated Jul. 25, 2008 issued in corresponding European patent application, Application No. 06714940.1—1232.

* cited by examiner

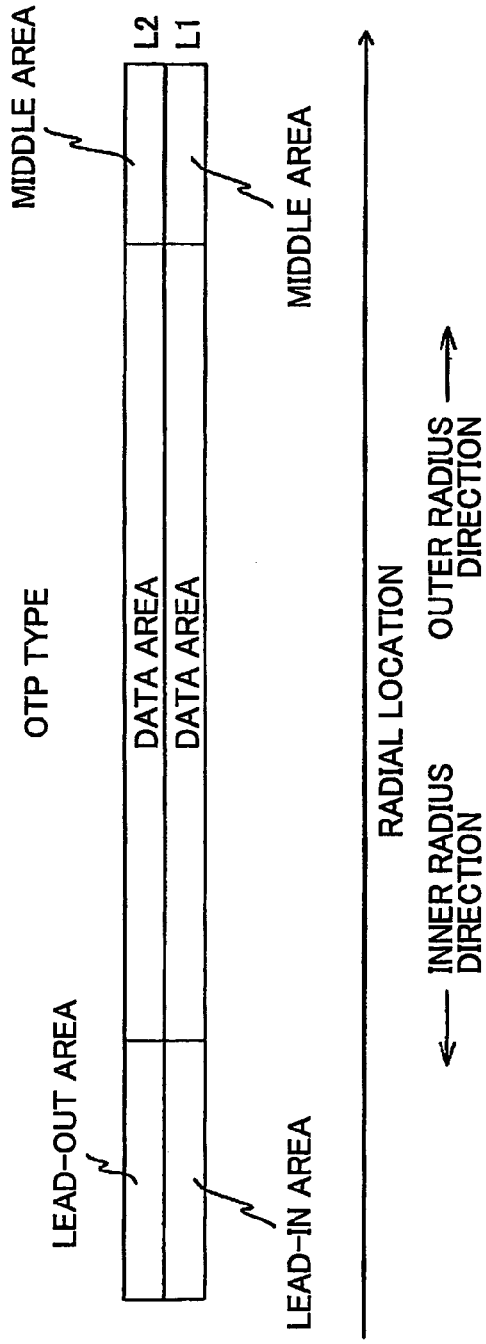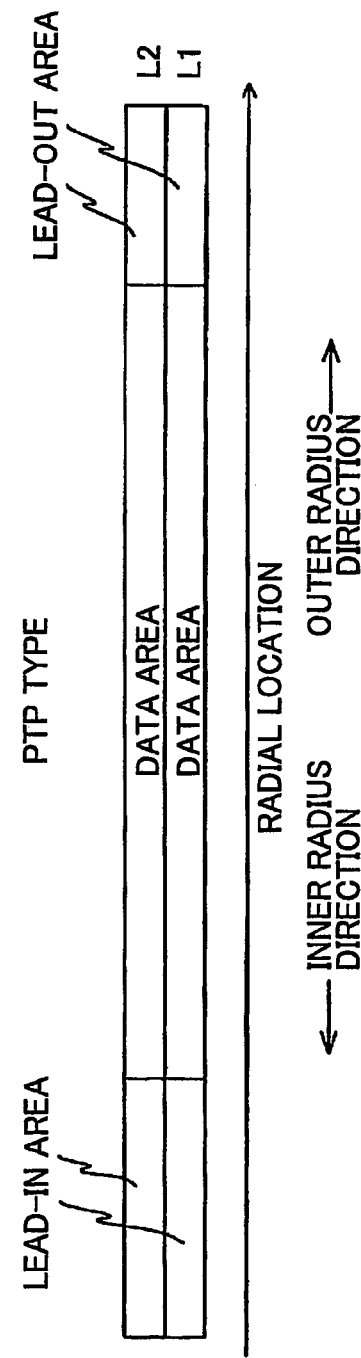

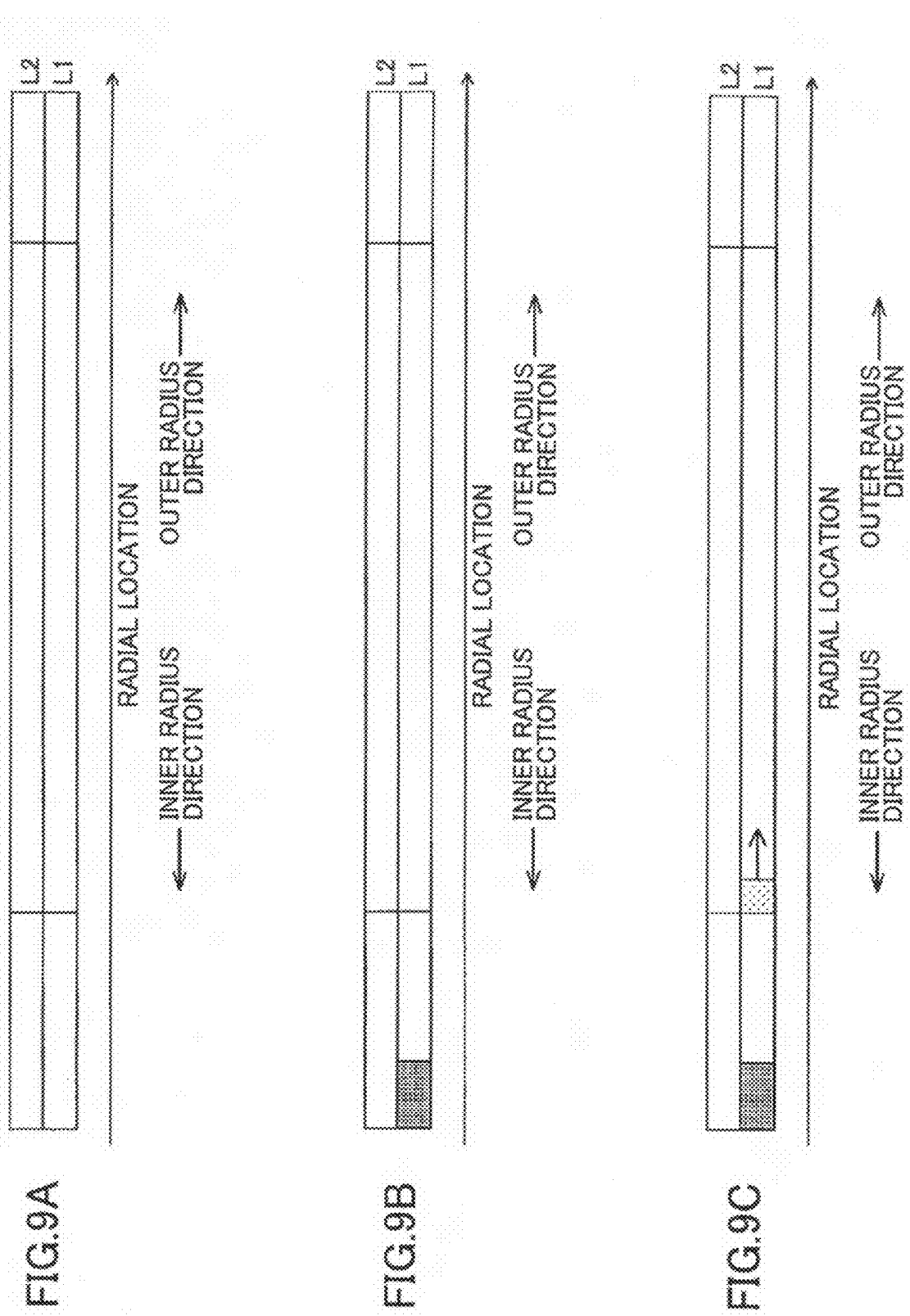

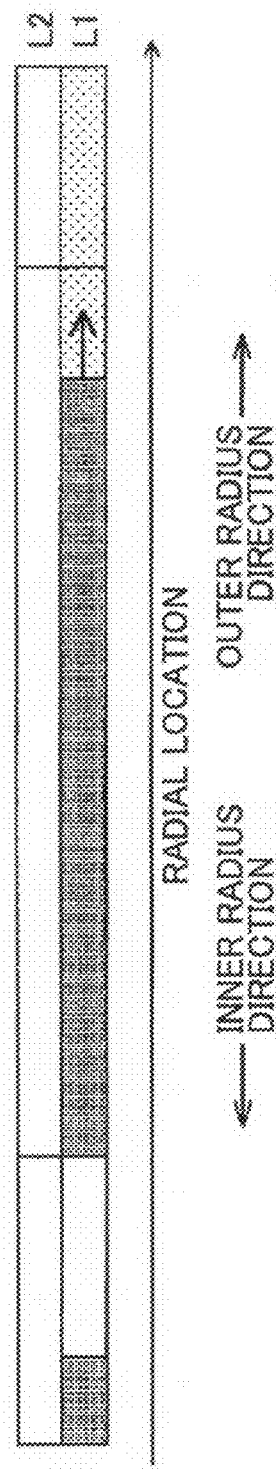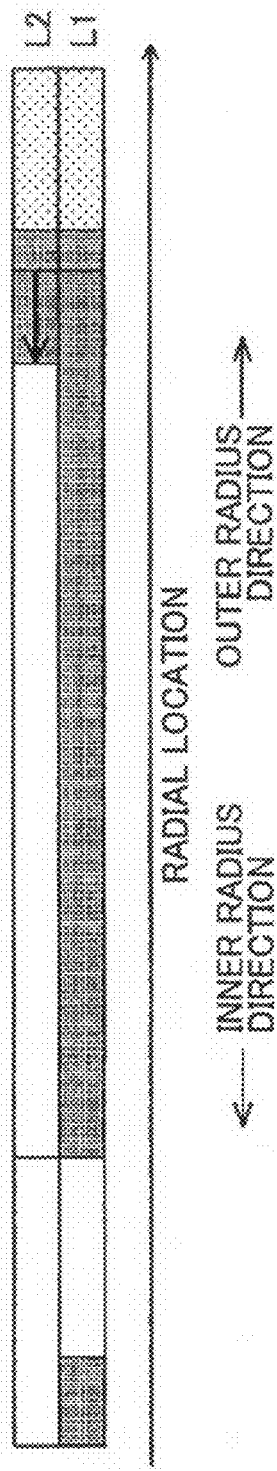

OPTICAL DISK, PROGRAM, RECORDING MEDIUM, INFORMATION RECORDING APPARATUS AND RECORDING METHOD

TECHNICAL FIELD

The present invention relates to an optical disk, a program, a recording medium, an information recording apparatus, and a recording method.

BACKGROUND ART

In recent years and continuing, optical disks (e.g., CDs (Compact Disc) and DVDs (Digital Versatile Disc)) serving to record computer programs, audio information, video information (hereinafter referred to as "contents") are drawing greater attention owing to the advances in digital technology and the improvements in data compression technology. Accordingly, as the optical disks become more inexpensive, optical disk apparatuses for reproducing the information recorded in the optical disks have grown to become widely used.

CD type optical disks that are available in the market include, for example, CD-R (CD-Recordable) and CD-RW (CD-Rewritable). DVD type optical disks that are available in the market include, for example, DVD-RAM, DVD-R (DVD-Recordable), DVD-RW (DVD-Rewritable), and DVD+RW (DVD+Rewritable).

The amount of information to be recorded in the optical disks is growing year by year. Therefore, further increase in the recording capacity of a single optical disk is expected. As for measures that are being developed for increasing the recording capacity of the optical disk, there are, for example, (1) increasing recording density and (2) increasing recording layers (see, for example, Japanese Laid-Open Patent Application No. 2001-126255 showing a method of recording information in a rewritable information recording medium having plural recording layers).

Drive apparatuses and optical disk players which are dedicated to reproducing read-only optical disks (e.g. CD-ROMs and DVD-ROMs) (hereinafter referred to as "reproduction only drive apparatuses") are already widely used. It is desired that these reproduction-only drive apparatuses also be able to reproduce recordable optical disks including rewritable type optical disks (e.g. CD-RW, DVD-RW, DVD+RW, DVD-RAM) and recordable type optical disks (e.g. CD-R, DVD-R).

Meanwhile, it is desired that rewritable optical disks, in particular, be able to perform random access for rewriting part of their data.

However, in some cases, being able to be reproduced by a reproduction only drive apparatus and being able to perform random access are difficult to achieve at the same time. For example, in a random access recorded optical disk, the optical disk includes recorded areas and unrecorded areas provided thereon in a scattered manner. Accordingly, in a case where such an optical disk is set in a reproduction only drive apparatus, reproduction error (e.g. uncontrollability and/or address error due to inability to obtain a proper address) may occur when a light beam is condensed onto an unrecorded area of the optical disk.

DISCLOSURE OF INVENTION

It is a general object of the present invention to provide an optical disk, a program, a recording medium, an information recording apparatus, and a recording method that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention can be realized and attained by an optical disk, a program, a recording medium, an information recording apparatus, and a recording method particularly pointed out in the specification in such full, clear, concise, and exact terms as to enable a person having ordinary skill in the art to practice the invention.

To achieve these and other advantages and in accordance with the purpose of the invention, as embodied and broadly described herein, the present invention provides a method for recording information in a rewritable optical disk having plural recording layers, the method including the steps of: selecting either a first recording mode dedicated to recording the information in an order applicable for recordable type optical disks or a second recording mode dedicated to recording the information in an order applicable for read-only type optical disk; and recording the information in the rewritable optical disk in accordance with the selected recording mode.

Furthermore, the present invention provides a rewritable optical disk having plural recording layers, the optical disk including: information including record mode information for instructing whether data are to be recorded according to a first recording mode dedicated to recording the data in an order applicable for recordable type optical disks or a second recording mode dedicated to recording the data in an order applicable for read-only type optical disk.

Furthermore, the present invention provides a program for causing a computer to execute a method of recording information in a rewritable optical disk having plural recording layers, the method including the steps of: selecting either a first recording mode dedicated to recording the information in an order applicable for recordable type optical disks or a second recording mode dedicated to recording the information in an order applicable for read-only type optical disk; and recording the information in the rewritable optical disk in accordance with the selected recording mode.

Furthermore, the present invention provides a recording medium including: a program according to an embodiment of the present invention.

Furthermore, the present invention provides an information recording apparatus for recording information in a rewritable optical disk having plural recording layers, the information recording apparatus including: a control unit configured to selecting either a first recording mode dedicated to recording the information in an order applicable for recordable type optical disks or a second recording mode dedicated to recording the information in an order applicable for read-only type optical disk; and a process unit configured to record the information in the rewritable optical disk in accordance with the selected recording mode.

Other objects and further features of the present invention will be apparent from the following detailed description when read in conjunction with the accompanying drawings.

BRIEF DESCRIPTION OF DRAWINGS

FIG. 4 is a schematic diagram for describing an OTP type single sided dual layer disk according to an embodiment of the present invention;

FIG. 5 is a schematic diagram for describing a PTP type single sided dual layer disk according to an embodiment of the present invention;

FIGS. 9A-9C are schematic diagrams for describing a formatting process according to an embodiment; and FIG. 10A-10E are schematic diagrams for describing a formatting process according to an embodiment.

BEST MODE FOR CARRYING OUT THE INVENTION

In the following, embodiments of the present invention are described with reference to FIGS. 1-10E.

Figure 1:
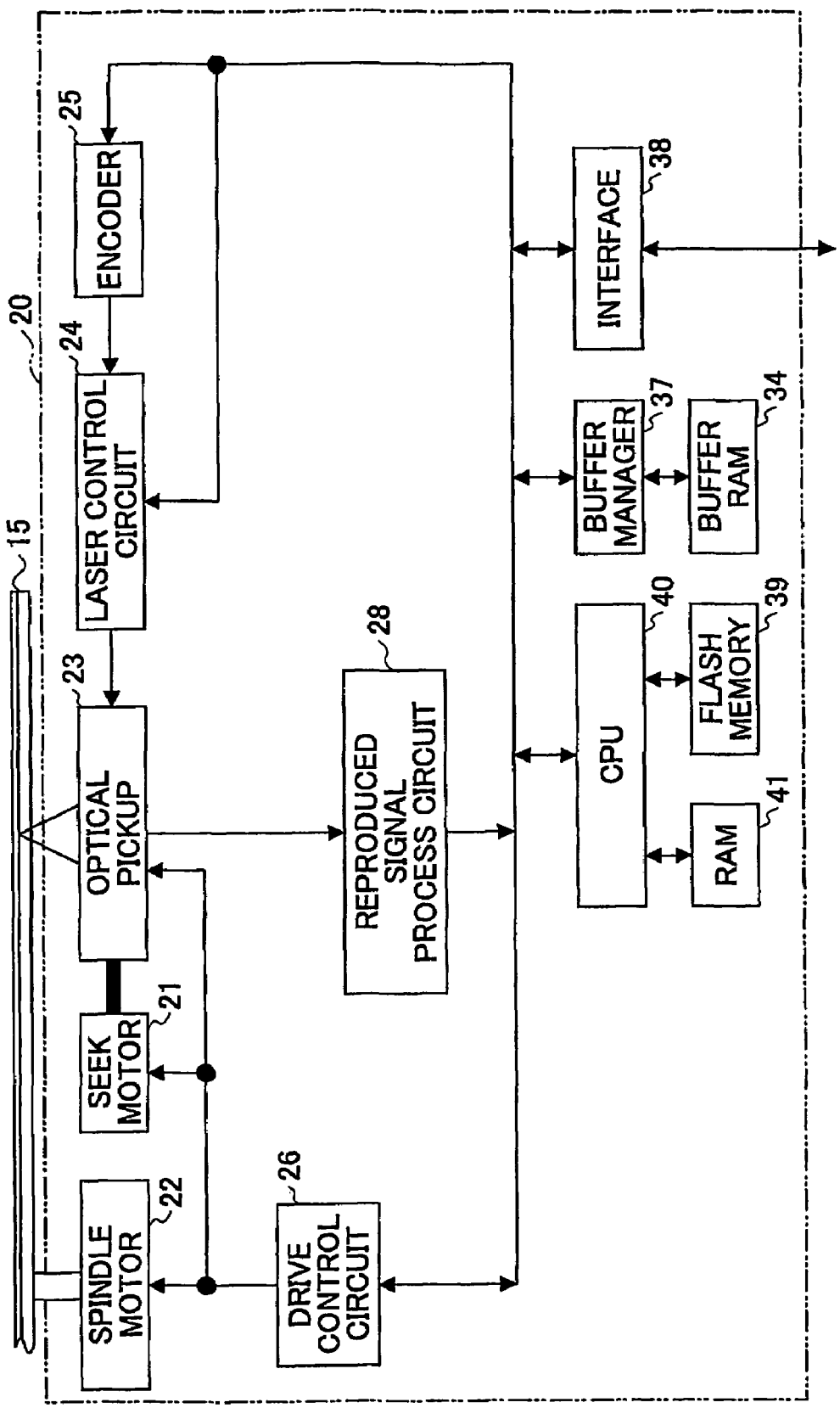
FIG. 1 is a block diagram showing an optical disk apparatus (information recording apparatus) according to an embodiment of the present invention.

FIG. 1 shows an optical disk apparatus 20 according to an embodiment of the present invention. The optical disk apparatus 20 includes, for example, a spindle motor 22 serving as a motor for driving the rotation of an optical disk 15, an optical pickup 23, a seek motor 21 for driving the optical pickup 23 in a sledge direction, a laser control circuit 24, an encoder 25, a drive control circuit 26, a reproduced signal process circuit 28, a buffer RAM 34, a buffer manager 37, an interface 38, a flash memory 39, a CPU 40, and a RAM 41. The arrows illustrated in FIG. 1 indicate an exemplary flow of signals and information and do not indicate all connections among the illustrated components (blocks). Furthermore, the optical disk apparatus 20 according to an embodiment of the present invention is applicable to an optical disk having plural recording layers (hereinafter referred to as "multilayer disk"). Furthermore, the optical disk 15 is an information recording medium that is capable of rewriting information recorded thereto.

The optical pickup 23 is for condensing a laser beam on a recording surface of the optical disk 15 and receiving the light reflected from the recording surface. Although not shown in the drawings, the optical pickup 23 also includes, for example, a semiconductor laser for irradiating a laser beam having a wavelength corresponding to the optical disk 15, an objective lens for condensing the laser beam from the semiconductor laser to the recording surface of the optical disk 15, a light reception unit for a bundle of rays reflected from the recording surface, and a driving system (including a focusing actuator and a tracking actuator) for driving the objective lens. The light reception unit includes plural light reception elements (or light reception areas). The light reception unit outputs signals (photoelectric transfer signals) to the reproduced signal process circuit 28 in accordance with the amount of light received in each light reception element (light reception area).

Based on the signals (photoelectric transfer signals) output from the light reception unit, the reproduced signal process circuit 28 obtains, for example, servo signals (focus error signals, track error signals) address information, synchronization signals, and RF signals. The obtained servo signals are output to the drive control circuit 26 and the CPU 40. The address information and the RF signals are output to the CPU 40. The synchronization signals are output to the encoder 25 and the drive control circuit 26. The reproduced signal process circuit 28 also performs, for example, a decoding process and an error detection process on the RF signals and performs error correction when an error is detected. After the error is corrected, the reproduced signal process circuit 28 stores the corrected signal in the buffer RAM 34 via the buffer manager 37.

Based on the track error signals from the reproduced signal process circuit 28, the drive control circuit 26 generates drive signals for the tracking actuator in order to correct the positional deviance of the objective lens with respect to the tracking direction. Furthermore, based on the focus error signals from the reproduced signal process circuit 28, the drive control circuit 26 generates drive signals for the focusing actuator in order to correct the focus deviance (out of focus) of the objective lens. The generated drive signals for the respective actuators are output to the optical pickup 23 for allowing the optical pickup 23 to perform tracking control and focus control. Furthermore, the drive control circuit 26 also generates drives signals for the seek motor 21 and for the spindle motor 22 based on the instructions from the CPU 40. The generated drive signals for the respective motors are output to the seek motor 21 and the spindle motor 22.

The buffer RAM 34 temporarily stores, for example, data which are to be recorded in the optical disk 15 (recording data) and data which are reproduced by the optical disk 15 (reproduction data). The input/output of the buffer RAM 34 is managed by the buffer manager 37.

Based on the instructions from the CPU 40, the encoder 25 extracts recording data stored in the buffer RAM 34 via the buffer manager 37, performs various processes on the recording data (e.g. modulating the recording data and/or adding error correction codes to the recording data), to thereby generate writing signals for writing the recording data in the optical disk 15. The generated writing signals are output to the laser control circuit 24.

The laser control circuit 24 controls the emission power of the semiconductor laser (not shown). For example, during a recording operation, the laser control circuit 24 generates drive signals for the semiconductor laser in accordance with the writing signals, recording conditions, and the emission characteristics of the semiconductor laser.

The interface 38 is a bi-directional communication interface complying with, for example, ATAPI (AT Attachment Packet Interface).

The flash memory 39 stores, for example, various programs (including a program of the present invention) which are written in code that can be decoded by the CPU 40, recording conditions (information on recording power, recording strategies, etc.,) and emission characteristics of the semiconductor laser.

The CPU 40 performs the overall control of the optical disk apparatus 20 according to the program(s) stored in the flash memory 39 and stores data used for performing the control in the RAM 41 and the buffer RAM 34.

Next, an exemplary configuration of a DVD recorder 100 including the optical disk apparatus 20 is described with reference to FIG. 2. The arrows illustrated in FIG. 2 indicate an exemplary flow of signals and information and do not indicate all connections among the illustrated components (blocks).

Figure 2:
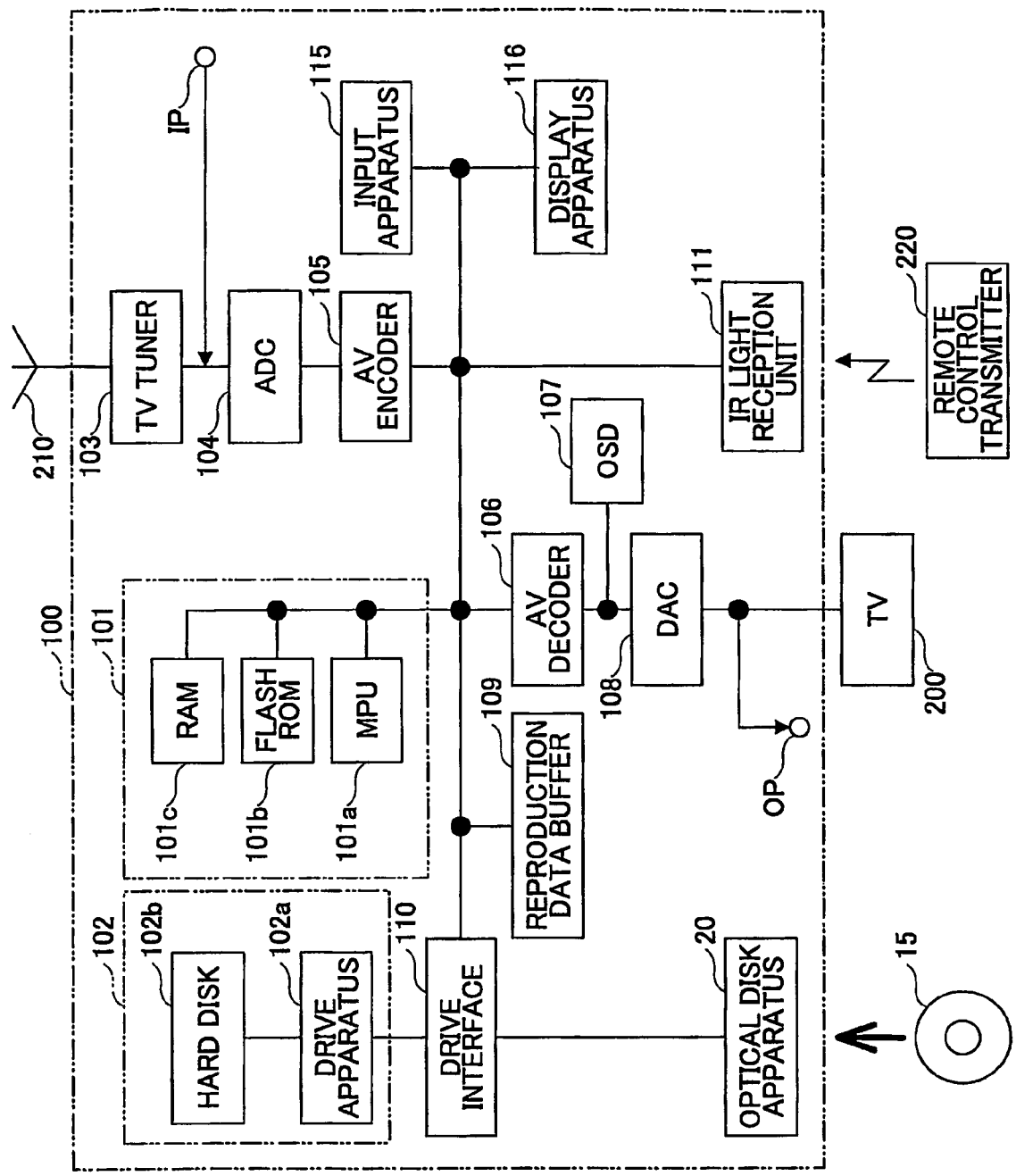
FIG. 2 is a block diagram showing a schematic configuration of a DVD recorder including an optical disk apparatus according to an embodiment of the present invention.

Other than including the optical disk apparatus 20, the DVD recorder 100 shown in FIG. 2 includes, for example, a main control apparatus 101, a hard disk apparatus 102, a TV tuner 103, an AD converter (ADC) 104, an AV encoder 105, an AV decoder 106, an on-screen display (OSD) 107, a DA converter (DAC) 108, a reproduction data buffer 109, a drive interface 110, an IR light reception unit 111, an input apparatus 115, and a display apparatus 116.

The main control apparatus 101 includes, for example, an MPU (Micro Processing Unit) 101a, a flash ROM 101b, and a RAM 101c. The flash ROM 101b stores, for example, a boot program that is written in code that can be decoded by the MPU 101a. The boot program is the first program that is executed upon turning on the power of the DVD recorder 100. The MPU 101a performs, for example, various checks (inspections) and initialization processes and obtains various information items in accordance with the boot program. The RAM 101c stores, for example, programs that are written in code that can be decoded by the MPU 101a, various data used by the MPU 101a for performing various processes, and various data obtained from the various processes of the MPU 101a. In other words, the MPU 101a performs the overall control of the DVD recorder 100 in accordance with the programs stored in the flash ROM 101b and the RAM 101c.

The hard disk apparatus 102 includes, for example, a hard disk 102b and a drive apparatus 102a for driving the hard disk 102b. The hard disk 102b stores, for example, various programs that are written in code that can be decoded by the MPU 101a and various data used by the MPU 101a for performing various processes. The programs stored in the hard disk 102b are loaded in the RAM 101c according to necessity and are executed by the MPU 101a. Furthermore, the various data stored in the hard disk 102b are transferred to the RAM 101c according to necessity.

The drive interface 110 is connected to the interface 38 of the optical disk apparatus 20. The drive interface 110 complies with the same interface standard as the interface 38.

The TV tuner 103 receives broadcasts via an antenna 210.

The ADC 104 performs A/D conversion on the signals (e.g. video signals, audio signals) output from the TV tuner 103. In addition, the ADC 104 may also perform A/D conversion on the signals output from, for example, a video camera via an external input terminal IP.

The AV encoder 105 performs encoding (compression) on the signals (e.g. video signals, audio signals) output from the ADC 104, to thereby generate recording data. The recording data are recorded in the optical disk 15 and/or the hard disk 102b via the drive interface 110.

The reproduction data buffer 109 temporarily stores data reproduced from the optical disk 15 and/or the hard disk 102b (reproduction data).

The AV decoder 106 extracts reproduction data stored in the reproduction data buffer 109 and performs, for example, decoding (decompression) on the extracted reproduction data.

The OSD 107 includes a character generator for displaying characters and figures on the screen of a television set (TV) 200.

The DAC 108 performs D/A conversion on the signals output from the AV decoder 106 and the signals output from the OSD 107. The signals output from the DAC 108 are output to the television set 200. The DAC 108 may also output its signals to a monitor other than the television set 200.

The IR light reception unit 111 receives light signals from a remote control transmitter 220 and reports the reception to the MPU 101a.

The input apparatus 115, which includes an input medium (e.g. control panel, not shown), reports input of various information items to the MPU 101a upon receiving the input from a user.

The display apparatus 116, which includes a display part (not shown) using, for example, a liquid crystal display (LCD), displays various information items in accordance with the instructions from the MPU 101a.

Next, the optical disk 15 according to an embodiment of the present invention is described.

Figure 3:
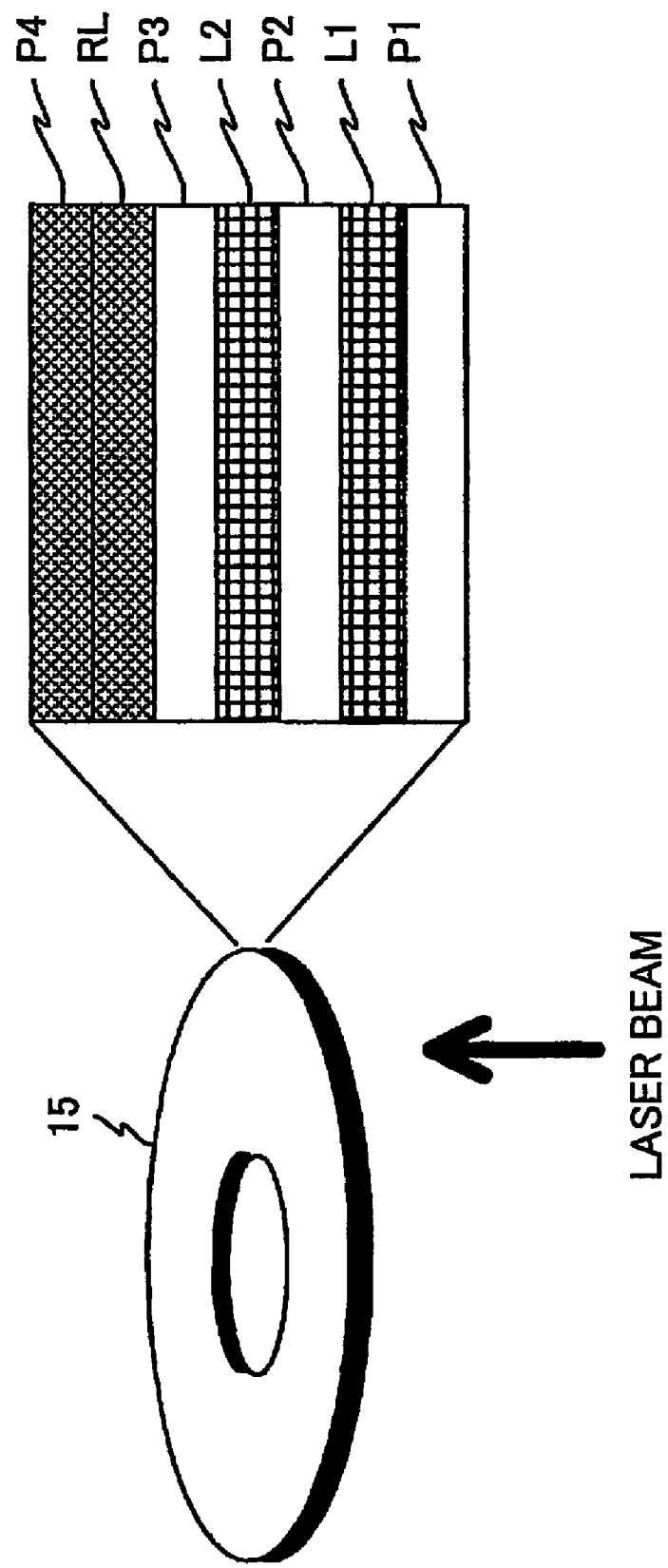
FIG. 3 is a schematic diagram for describing a single sided dual layer disk according to an embodiment of the present invention.

FIG. 3 shows an exemplary configuration of the optical disk 15. Here, the optical disk 15 includes a first protection layer P1, a first recording layer L1, a second protection layer P2, a second recording layer L2, a third protection layer P3, a light reflection layer RL, and a fourth protection layer (print protection layer) P4 that are layered in this order from the light incident direction (arrow direction in FIG. 3) of the optical disk 15. In addition, a translucent film that is formed of a metal material or a dielectric material is provided between the first recording layer L1 and the second protection layer P2. In other words, the optical disk 15 according to an embodiment of the present invention is a so-called single sided dual layer disk. Spiral or concentric tracks with guiding grooves are formed in each recording layer L1, L2. The optical disk 15 according to an embodiment of the present invention is mounted on the optical disk apparatus 20 in a manner so that the first recording layer L1 is situated closer to optical pickup 23 than the second recording layer L2. A portion of the laser beam incident on the optical disk 15 is reflected by the translucent film and the remaining portion of the laser beam is transmitted through the translucent film. The laser beam transmitted through the translucent film is reflected by the light reflection layer RL. For the sake of convenience, the laser beam reflected by the translucent film is hereinafter referred to as "reflection beam from the first recording layer L1", "reflection beam of the first recording layer L1" or "first reflection beam"; the laser beam reflected by the light reflection layer RL is hereinafter referred to as "reflection beam from the second recording layer L2", "reflection beam of the second recording layer L2" or "second reflection beam".

There are two types of single sided dual layer disks which differ depending on the track path (i.e. scanning path for reading data). One is a Opposite Track Path (hereinafter referred to as "OTP") type disk, and the other is a Parallel Track Path (hereinafter referred to as "PTP") type disk.

In the OTP type disk (see example shown in FIG. 4), the first recording layer L1 starts from a lead-in area at the inner radius of the disk, proceeds to a data area, and ends at a middle area at the outer radius of the disk. The second recording layer L2 starts from a middle area at the outer radius of the disk, proceeds to a data area, and ends at a lead-out area at the inner radius of the disk. Accordingly, the physical addresses of the first recording layer L1 are allocated in a consecutively increasing manner from the lead-in area (at the inner radius of the disk) to the middle area (at the outer radius of the disk). Meanwhile, the physical addresses of the second recording layer L2 are allocated in a manner that the physical addresses of the first recording layer L1 are bit-flipped (reversed) from the middle area (at the outer radius of the disk) to the lead-out area (at the inner radius of the disk). That is, the physical addresses of the second recording layer L2 are allocated in a consecutively increasing manner from the middle area (at the outer radius of the disk) to the lead-out area (at the inner radius of the disk). In the OTP type disk, the track path direction (scanning direction) of the first recording layer L1 starts at the lead-in area and proceeds until the middle area of the first recording layer L1 is reached, and the track path direction (scanning direction) of the second recording layer L2 starts at the middle area of the second recording layer L2 and proceeds until the lead-out area is reached.

In the OTP type disk, the radial location of the starting position of the lead-in area and the terminating position of the lead-out area, the radial location of the terminating position of the data area of the first recording layer L1 and the starting position of the data area of the second recording layer L2, the radial location of the starting position of the middle area of the first recording layer L1 and the terminating position of the middle area of the second recording layer L2, and the radial location of the terminating position of the first recording layer L1 and the starting position of the middle area of the second recording layer L2 are the same, respectively. Meanwhile, in some cases, the radial location of the starting position of the data area of the first recording layer L1 and the terminating position of the data area of the second recording layer L2 do not match. In these cases where the starting position of the data area of the first recording layer L1 and the terminating position of the data area of the second recording layer L2 do not match, a lead-out is recorded in the remaining unrecorded area for making up for this difference. It is to be noted that "radial location" refers to the location on the disk with respect to the radial direction of the disk, that is, the center of rotation of the disk is the reference point of the radial location.

In the PTP type disk (see example shown in FIG. 5), each recording layer has an information area that is divided into a lead-in area, a data area, and a lead-out area from the inner radius of the disk to the outer radius of the disk. That is, in the PTP type disk, each recording has its own information area. It may, therefore, be regarded that the PTP type disk has two independent recording layers, in which each recording layer has physical addresses that are allocated in a consecutively increasing manner from the inner radius of the disk to the outer radius of the disk. In the PTP type disk, the track path direction (scanning direction) of each recording layer starts at the lead-in area at the inner radius of the disk and proceeds to the lead-out area at the outer radius of the disk.

In the PTP type disk, the radial location of the starting and terminating positions of the lead-in areas of both recording layers, the starting positions of the data areas of both recording layers, and the terminating positions of the lead-out areas of both recording layers are the same, respectively. Meanwhile, in some cases, the radial locations of the starting positions of the lead-out areas of the two recording layers (i.e. the terminating positions of the data areas of the two recording layers) do not match. In these cases where the starting positions of the lead-out areas of the two recording layers (i.e. the terminating positions of the data areas of the two recording layers) do not match, a lead-out is recorded in the remaining unrecorded area for making up for this difference.

The optical disk 15 according to an embodiment of the present invention is described by using an example of an OTP type single sided dual layer disk.

Figure 6:
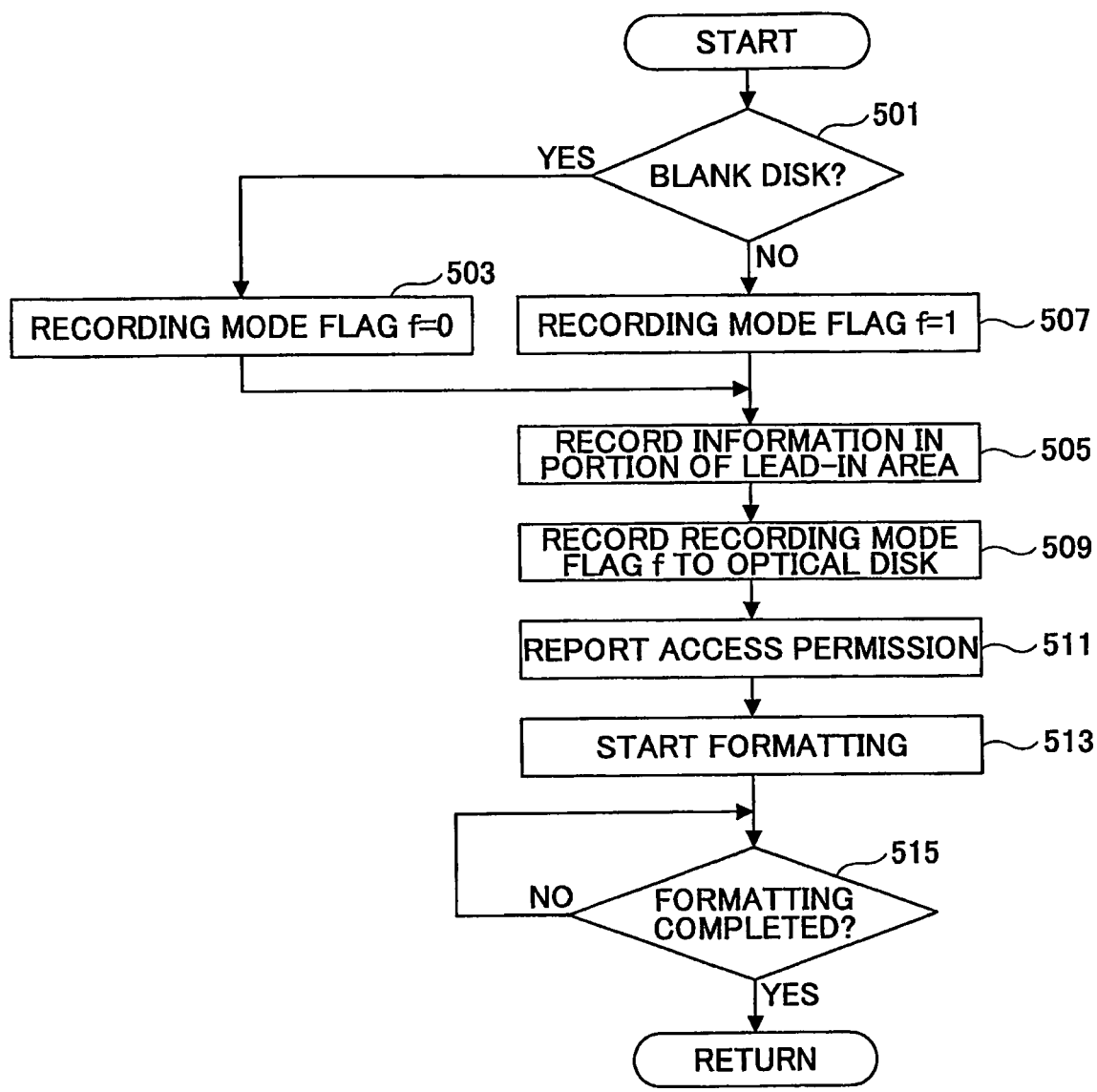
FIG. 6 is a flowchart for describing a formatting process according to an embodiment of the present invention.

Next, a formatting process performed by the optical disk apparatus 20 according to an embodiment of the present invention is described. FIG. 6 shows a flowchart of an algorithm for the formatting process including a series of processes executed by the CPU 40. When the CPU 40 receives a command to perform a formatting process (format request command) from the MPU 101a, the leading address of the program corresponding to the algorithm shown in the flowchart of FIG. 6 is set to the program counter of the CPU 40. Thereby, the CPU 40 begins the formatting process. In this example, the formatting process according to an embodiment of the present invention is performed by the so-called background formatting.

In Step S501, the CPU 40 determines whether the optical disk 15 is a blank disk. If the optical disk 15 is a blank disk (See FIG. 9A), the process proceeds to Step S503. It is to be noted that a blank disk includes a disk in which all of its recorded data are wiped out by having a strong laser beam irradiated to its recording surface.

In Step S503, the CPU 40 sets "0" (in this example, "0" indicates an alternate recording mode (first recording mode)) as a recording mode flag f. The recording mode flag f serves as the information for determining the recording mode. The alternate recording mode is where recording is alternately performed on respective predetermined partial areas located at substantially the same radial locations of plural recording layers. A single predetermined partial area covers an area of a predetermined size (also referred to as "reference alternate area", for example, 1 ECC block). In other words, the recording process with the alternate recording mode (first recording mode) is performed by presetting the size of a unit recording area to which data can be consecutively recorded and alternately recording the data to one or more recording areas situated on different recording layers. Each recording area has a size corresponding to the unit recording area so that information is recorded in respective areas of the preset size. Each recording area is located at substantially the same radial location of the plural recording layers of the recordable optical disk so that the information is recorded area by area.

Then, in Step S505, predetermined information is recorded to a portion of the lead-in area of the optical disk 15 (See FIG. 9B).

Then, in Step S509, the recording mode flag F is recorded to the lead-in area of the optical disk 15.

Then, in Step S511, access permission is reported to the MPU 101a. This allows recording, and reproduction to be performed even where formatting is not completed.

Then, in Step S513, the formatting operation is started. Accordingly, the encoder 25, the laser control circuit 24, and the optical pickup 23, for example, are suitable operated, to thereby allow predetermined data to be sequentially written on the first recording layer L1 from the starting to terminating position of the first recording layer L1 (See FIG. 9C).

In Step S515, the CPU 40 determines whether the formatting operation is completed. If the formatting operation is completed, the formatting process is completed (Y in Step S515). If the formatting operation is not completed, the CPU 40 waits for a predetermined period and again determines whether the formatting operation is completed after the predetermined period elapses. In a case where a reproduction operation or a recording operation is requested before the formatting operation is completed, the formatting operation is temporarily stopped. Then, upon the completion of the reproduction operation or the recording operation, the formatting operation is resumed.

In Step S501, in a case where the CPU 40 determines that the optical disk 15 is not a blank disk (e.g. formatted disk), the process proceeds to Step S507. The formatted disk may be a disk that is formatted for the first time or a disk that is formatted again (i.e. reformatted disk).

In Step S507, the CPU 40 sets "1" (in this example, "1" indicates a sequential recording mode (second recording mode)) to the recording mode flag f. The sequential recording mode is where recording is performed in the same direction as the physical addresses increase. In other words, the recording process with the sequential recording mode (second recording mode) is performed by recording information on respective recording layers of plural recording layers (i.e. layer by layer). Then, the process proceeds to Step S505-S515.

Figure 7:
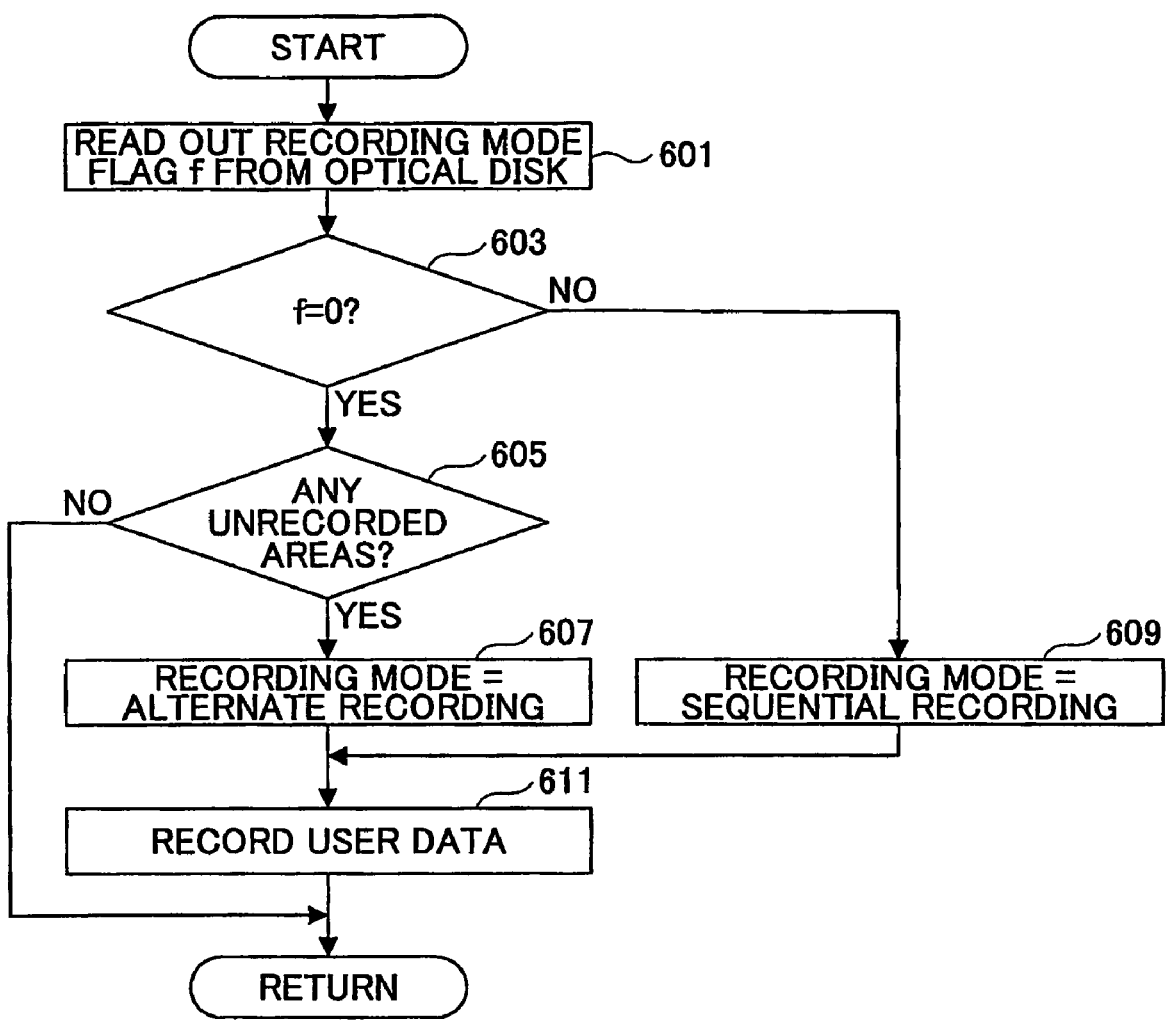
FIG. 7 is a flowchart for describing a recording process according to an embodiment of the present invention.

Next, a recording process performed by the optical disk apparatus 20 according to an embodiment of the present invention is described. FIG. 7 shows a flowchart of an algorithm for the recording process including a series of processes executed by the CPU 40.

When the CPU 40 receives a command to perform a recording process (recording request command) from the MPU 101a, the leading address of the program corresponding to the algorithm shown in the flowchart of FIG. 7 is set to the program counter of the CPU 40. Thereby, the CPU 40 begins the recording process.

In Step S601, the recording mode flag f is read out from the lead-in area of the optical disk 15.

Then, in Step S603, the CPU 40 determines whether the recording mode flag f is "0". If the recording mode flag f is "0" (YES in Step S603), the process proceeds to Step S605.

Then, in Step S605, the CPU 40 determines whether there are any unrecorded areas in the data area. If there is an unrecorded area in the data area (YES in Step S605), the process proceeds to Step S607.

Then, in Step S607, the alternate recording mode is set as the recording mode.

Figure 10A:
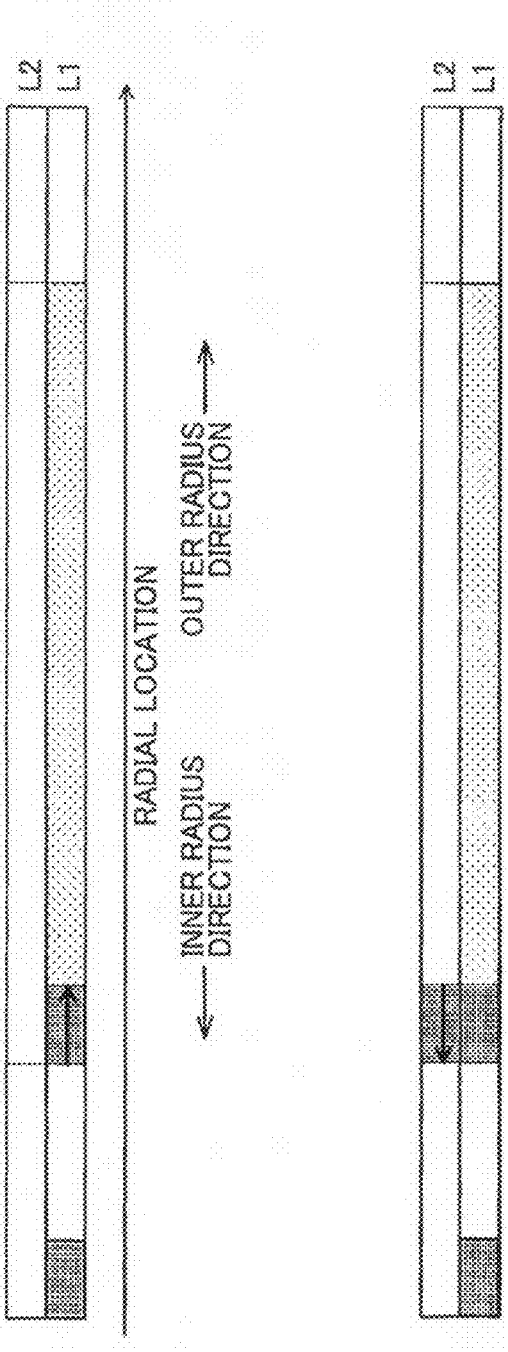
Figure 10B:
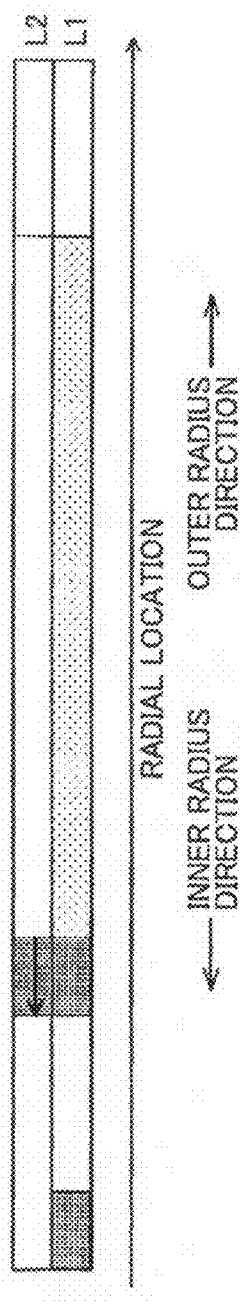

Then, in Step S611, designated user data are recorded in the optical disk 15. For example, as shown in FIG. 10A, the user data are recorded from a starting position of the data area of the first recording layer L1 towards the direction of the outer radius of the optical disk 15. Then, as shown in FIG. 10B, when the user data are recorded to the data area of the first recording layer L1 to the extent of the size (area) of the reference alternate area, the focus for recording switches (jumps) to an opposite position on the second recording layer L2, to thereby record the user data from the opposite position on the second recording layer L2 towards the direction of the inner radius of the optical disk 15 (i.e. direction in which the physical addresses increase). Then, when the user data are recorded on the data area of the second recording layer L2 to the extent of the size (area) of the reference alternate area, the focus for recording switches (jumps) back to the first recording layer L1 at a position where it has previously left off for recording the user data on the first recording layer L1. Then, the user data are further recorded on the data area of the first recording layer L1 to the extent of the size (area) of the reference alternate area. In other words, recording is alternately performed on the first and second recording layers L1, L2 in units of the reference alternate area. Accordingly, an unrecorded area on the second recording layer L2, which is situated substantially at the same radial position of a recorded area on the first recording layer L2, becomes a recorded area. The recording process is ended when the recording of the designated user data is completed.

Figure 10C:
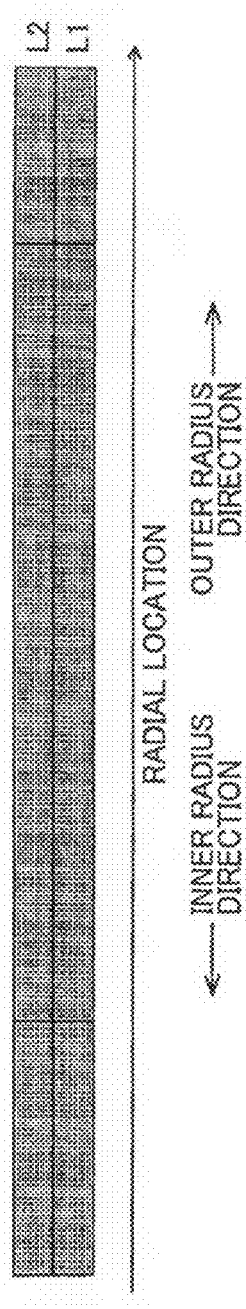

Meanwhile, in Step S605, the recording process is ended if the CPU 40 determines that there are no unrecorded areas in the data area as shown in FIG. 10C. That is, the recording of the user data is not performed.

Furthermore, in Step S603, the recording process proceeds to Step S609 when the CPU 40 determines that the recording mode flag f is not "0" (NO in Step S603).

Then, in Step S609, the recording mode is set to the sequential recording mode. Then, the recording process proceeds to Step S611. In this case, the user data are sequentially (successively) recorded on the data area of the first recording layer L1 (in this example, the user data are sequentially recorded towards the outer radius of the optical disk 15) as shown in FIG. 10D. Then, when there are no more unrecorded areas remaining in the data area of the first recording layer L1, the focus for recording switches (jumps) to the second recording layer L2, to thereby record the user data on the second recording layer L2 from the outer radius of the optical disk 15 toward the inner radius of the optical disk 15 (i.e. direction in which the physical addresses increase).

As opposed to the sequential recording mode which can record data by simply recording in the same direction as the direction of the increasing physical addresses, the alternate recording mode may sometimes require a seek operation for moving the optical pickup 23 to the location of a target address. Therefore, there is a possibility that the recording speed of the alternate recording mode may be slower than that of the sequential recording mode. Therefore, in a case of performing the recording operation with the alternate recording mode, such possibility may be, for example, reported to the main control apparatus 101 beforehand. Furthermore, the main control apparatus 101 may also inquire whether there is a possibility of the recording speed becoming slower.

Figure 8:
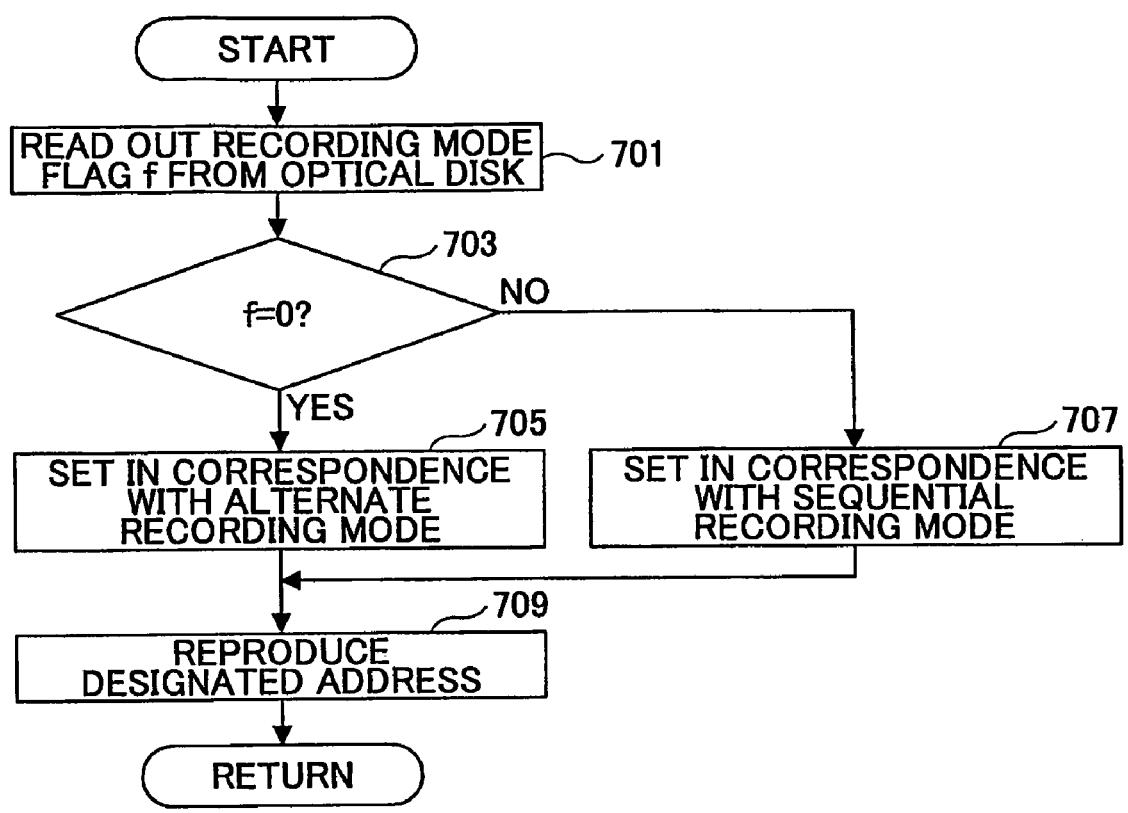
FIG. 8 is a flowchart for describing a reproduction process according to an embodiment of the present invention.

Next, a reproduction process performed by the optical disk apparatus 20 according to an embodiment of the present invention is described. FIG. 8 shows a flowchart of an algorithm for the reproduction process including a series of processes executed by the CPU 40.

When the CPU 40 receives a command to perform a reproduction process (reproduction request command) from the MPU 101a, the leading address of the program corresponding to the algorithm shown in the flowchart of FIG. 8 is set to the program counter of the CPU 40. Thereby, the CPU 40 begins the reproduction process.

In Step S701, the recording mode flag f is read out from the lead-in area of the optical disk 15.

Then, in Step S703, the CPU 40 determines whether the recording mode flag f is "0". If the recording mode flag f is "0" (YES in Step S703), the reproduction process proceeds to Step S705.

Then, in Step S705, a reproduction type corresponding to the alternate recording mode is set.

Then, in Step S709, a designated address is reproduced. When the reproduction of the designated address is completed, the reproduction process is ended.

Meanwhile, in Step S703, the reproduction process proceeds to Step S707 when the CPU 40 determines that the recording mode flag f is not "0" (NO in Step S703).

Then, in Step S707, a reproduction type corresponding to the sequential recording mode is set. Then, the reproduction process proceeds to Step S709. Then, in Step S709, the designated address is reproduced. When the reproduction of the designated address is completed, the reproduction process is ended.

In the above-described optical disk apparatus 20 according to an embodiment of the present invention, the optical pickup 23, the laser control circuit 24, the encoder 25, and the reproduction signal process circuit 28 may be included in a process unit (process apparatus) according to an embodiment of the present invention.

Furthermore, the CPU 40 and the program(s) (processes) executed by the CPU 40 may be executed by a control unit (control apparatus) and/or a setting unit (setting apparatus) according to an embodiment of the present invention. For example, Steps S601, S603, S607, and S609 in FIG. 7 may be executed by the control unit according to an embodiment of the present invention. Furthermore, Steps S501, S503, S507, and S509 in FIG. 6 may be, for example, executed by the setting unit according to an embodiment of the present invention.

Moreover, the processes (steps) executed by the CPU 40 via the control unit and/or the setting unit may also be partly or entirely executed using other hardware.

Furthermore, among the various programs which may be recorded in the flash memory (recording medium) 39 according to an embodiment of the present invention, one or more programs corresponding to the algorithm shown in FIGS. 6 and 7 may be employed for executing the program according to an embodiment of the present invention. For example, a program corresponding to Steps S601, S603, S607, and S609 of FIG. 7 may execute a selecting procedure; a program corresponding to Step S611 of FIG. 7 may execute a recording procedure for recording information (user data); a program corresponding to Step S501 of FIG. 6 may execute a determining procedure; a program corresponding to Step S503 of FIG. 6 may execute a selecting (setting) procedure for selecting (setting) a first recording mode; a program corresponding to Step S507 of FIG. 6 may execute a selecting (setting) procedure for selecting (setting) a second recording mode and; a program corresponding to Step S509 of FIG. 6 may execute a further recording procedure for recording record mode information.

Furthermore, the method for recording information in the rewritable optical disk having plural recording layers includes the above-described formatting process and the recording process shown in FIGS. 6 and 7. For example, the selecting step of the method may be achieved by executing the Steps S601, S603, S607, and S609 of FIG. 7; the recording step (information recording step) of the method may be achieved by executing the Step S611 of FIG. 7; the determining step of the method may be achieved by the Step S501 of FIG. 7; the selecting step (first and second recording mode selecting step) of the method may be achieved by executing the Steps S503 and S507 of FIG. 7; and the further recording step (record mode recording step) of the method may be achieved by executing the Step S509.

As described above, with the optical disk apparatus 20 according to an embodiment of the present invention, information (user data) can be recorded in the optical disk 15 by an appropriate recording mode that is selected based on the recording mode flag f (setting information). For example, in a case where the recording mode flag f is "0", the alternate recording mode (first recording mode) is selected; and in a case where the recording mode flag f is "1", the sequential recording mode (second recording mode) is selected. Thereby, information can be recorded in the optical disk (rewritable optical disk) 15 having plural recording layers in accordance with, for example, the state of each recording layer.

Furthermore, according to an embodiment of the present invention, the recording mode flag may be set to "0" in case where the optical disk 15 is a blank disk. Therefore, the recording mode can be set according to the characteristics of the optical disk 15 (for example, in a case of performing random access for rewriting information in a part of a rewritable optical disk). Thus, the user is not required to perform any complicated settings for recording information to the optical disk 15.

Furthermore, according to an embodiment of the present invention, the recording mode flag may be set to "1" in case where the optical disk 15 is not a blank disk including an optical disk that is formatted. Therefore, the recording mode can be set for prioritizing applicability or compatibility with respect to a read-only type optical disk (read-only type optical disk drive).

Furthermore, the optical disk 15 according to an embodiment of the present invention may have a recording mode flag f (record mode information) recorded thereto. Accordingly, recording of information can be suitably performed according to the state of each recording layer even after the recording of user data is performed numerous times. In this case also, the user is not required to perform any complicated settings for recording information in the optical disk 15.

Although the optical disk 15 is described above using an example of an OTP type single sided dual layer disk, a PTP type single sided dual layer disk may also be employed.

Furthermore, although the optical disk 15 is described as having two layers, the optical disk 15 is not limited to having two layers. The optical disk 15 may alternatively have three or more layers.

Although the program according to an embodiment of the present invention is described as being recorded in the flash memory 39, the program may also be recorded in other recording media (e.g. a CD, a magneto-optical disk, a DVD, a memory card, a USB memory, a flexible disk). In such a case the program recorded in the other recording media, is to be loaded to the flash memory 39 via a reproduction apparatus (or a corresponding interface) for reproducing the recording media. The program of the present invention may also be transferred to the flash memory 39 via a network (e.g. a LAN, an intranet, the Internet). In other words, the program may be recorded in other applications as long as the program is loaded in the flash memory 39.

Although the optical pickup 23 is described using an example of a single semiconductor laser, plural lasers may also be employed. For example, multiple lasers that emit beams of different wavelengths may be used. In such a case, one semiconductor laser may emit a beam having a wavelength of approximately 405 nm, another semiconductor laser may emit a beam having a wavelength of approximately 660 nm, and yet another semiconductor laser may emit a beam having a wavelength of approximately 780 nm. In other words, the optical disk apparatus 20 according to an embodiment of the present invention includes an optical disk apparatus that is compatible with various optical disks of different standards, in which one of the optical disk may be an optical disk having plural recording layers.

Furthermore, the optical disk 15 according to an embodiment of the present invention includes CD type optical disks and DVD type optical disks that serve as the next generation recording media corresponding to a light beam having a wavelength of approximately 405 nm.

Although the optical disk apparatus (information recording apparatus) 20 according to an embodiment of the present invention is described above as an apparatus that can record and reproduce information to/from the optical disk 15, the optical disk apparatus 20 includes other optical apparatuses as long as the apparatus can record information in the optical disk 15.

Although each interface is described above as complying with the ATAPI standard, other interfaces may also be employed. For example, the interface may comply with any one of an ATA (AT Attachment), a SCSI (Small Computer System Interface), a USB (Universal Serial Bus) 1.0, a USB 2.0, a IEEE 1394, a IEEE 802.3, a serial ATA, and a serial ATAPI.

The optical disk apparatus 20 according to an embodiment of the present invention includes, for example, a DVD recorder having the functions of the above-described optical disk 20.

Hence, with the present invention, the recording mode can be set for prioritizing applicability or compatibility with respect to a recordable type optical disk (recordable type optical disk drive) or a read-only type optical disk (read-only type optical disk drive) in accordance with, for example, the state of each recording layer of a rewritable optical disk having plural recording layers.

Further, the present invention is not limited to these embodiments, but variations and modifications may be made without departing from the scope of the present invention.

The present application is based on Japanese Priority Application No. 2005-049927 filed on Feb. 25, 2005, with the Japanese Patent Office, the entire contents of which are hereby incorporated by reference.

The invention claimed is:

1. A method for recording information in a rewritable optical disk having plural recording layers, the method comprising the steps of:
   selecting either a first recording mode, wherein the information is recorded in an order applicable for recordable type optical disks, or a second recording mode, wherein the information is recorded in an order applicable for read-only type optical disks; and
   recording the information in the rewritable optical disk in accordance with the selected recording mode.

2. The method as claimed in claim 1, further comprising a step of:
   determining whether the rewritable optical disk is a blank disk having no information recorded thereto;
   wherein the first recording mode is selected when the rewritable optical disk is determined to be the blank disk, wherein the second recording mode is selected when the rewritable optical disk is determined not to be the blank disk.

3. The method as claimed in claim 1, further comprising a step of: recording record mode information in the rewritable optical disk.

4. The method as claimed in claim 1, wherein the recording step according to the first recording mode is executed by presetting the size of a unit recording area to which data can be consecutively recorded and alternately recording the data to one or more recording areas situated on different recording layers, wherein each recording area has a size corresponding to the unit recording area, wherein each recording area is located at substantially the same radial location of the recordable optical disk.

5. The method as claimed in claim 1, wherein the recording step according to the second recording mode is executed by recording data on one layer after another.

6. A rewritable optical disk having plural recording layers, the optical disk comprising:
   information including record mode information for instructing whether data are to be recorded according to a first recording mode, wherein the data is recorded in an order applicable for recordable type optical disks, or a second recording mode, wherein the data is recorded in an order applicable for read-only type optical disks.

7. A computer-readable medium encoding a program for causing a computer to execute a method of recording information in a rewritable optical disk having plural recording layers, the method comprising the steps of:
   selecting either a first recording mode, wherein the information is recorded in an order applicable for recordable type optical disks, or a second recording mode, wherein the information is recorded in an order applicable for read-only type optical disks; and
   recording the information in the rewritable optical disk in accordance with the selected recording mode.

8. The medium as claimed in claim 7, wherein the method further includes a step of:
   determining whether the rewritable optical disk is a blank disk having no information recorded thereto;
   wherein the first recording mode is selected when the rewritable optical disk is determined to be the blank disk, wherein the second recording mode is selected when the rewritable optical disk is determined not to be the blank disk.

9. The medium as claimed in claim 7, wherein the method further includes a step of: recording record mode information in the rewritable optical disk.

10. The medium as claimed in claim 7, wherein the recording step according to the first recording mode is executed by presetting the size of a unit recording area to which data can be consecutively recorded and alternately recording the data to one or more recording areas situated on different recording layers, wherein each recording area has a size corresponding to the unit recording area, wherein each recording area is located at substantially the same radial location of the recordable optical disk.

11. The medium as claimed in claim 7, wherein the recording step according to the second recording mode is executed by recording data on one layer after another.

12. An information recording apparatus for recording information in a rewritable optical disk having plural recording layers, the information recording apparatus comprising:
   a control unit configured to select either a first recording mode, wherein the information is recorded in an order applicable for recordable type optical disks, or a second recording mode, wherein the information is recorded in an order applicable for read-only type optical disk; and
   a process unit configured to record the information in the rewritable optical disk in accordance with the selected recording mode.

13. The information recording apparatus as claimed in claim 12, further comprising:
   a setting unit configured to determine whether the rewritable optical disk is a blank disk having no information recorded thereto;
   wherein the first recording mode is selected when the rewritable optical disk is determined to be the blank disk, wherein the second recording mode is selected when the rewritable optical disk is determined not to be the blank disk.

14. The information recording apparatus as claimed in claim 12, wherein the setting unit is further configured to record record mode information in the rewritable optical disk.

15. The information recording apparatus as claimed in claim 12, wherein the recording according to the first recording mode is executed by presetting the size of a unit recording area to which data can be consecutively recorded and alternately recording the data to one or more recording areas situated on different recording layers, wherein each recording area has a size corresponding to the unit recording area, wherein each recording area is located at substantially the same radial location of the recordable optical disk.

16. The information recording apparatus as claimed in claim 12, wherein the recording according to the second recording mode is executed by recording data on one layer after another.

* * * * *

UNITED STATES PATENT AND TRADEMARK OFFICE
CERTIFICATE OF CORRECTION

PATENT NO. : 7,593,296 B2
APPLICATION NO. : 10/592502
DATED : September 22, 2009
INVENTOR(S) : Ryoichi Suzuki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 275 days.

Signed and Sealed this

Twenty-first Day of September, 2010

David J. Kappos
*Director of the United States Patent and Trademark Office*